Sept. 9, 1930.  B. L. BOBROFF  1,775,585
SWITCH FOR SIGNALING SYSTEMS
Filed July 31, 1929.  3 Sheets-Sheet 1
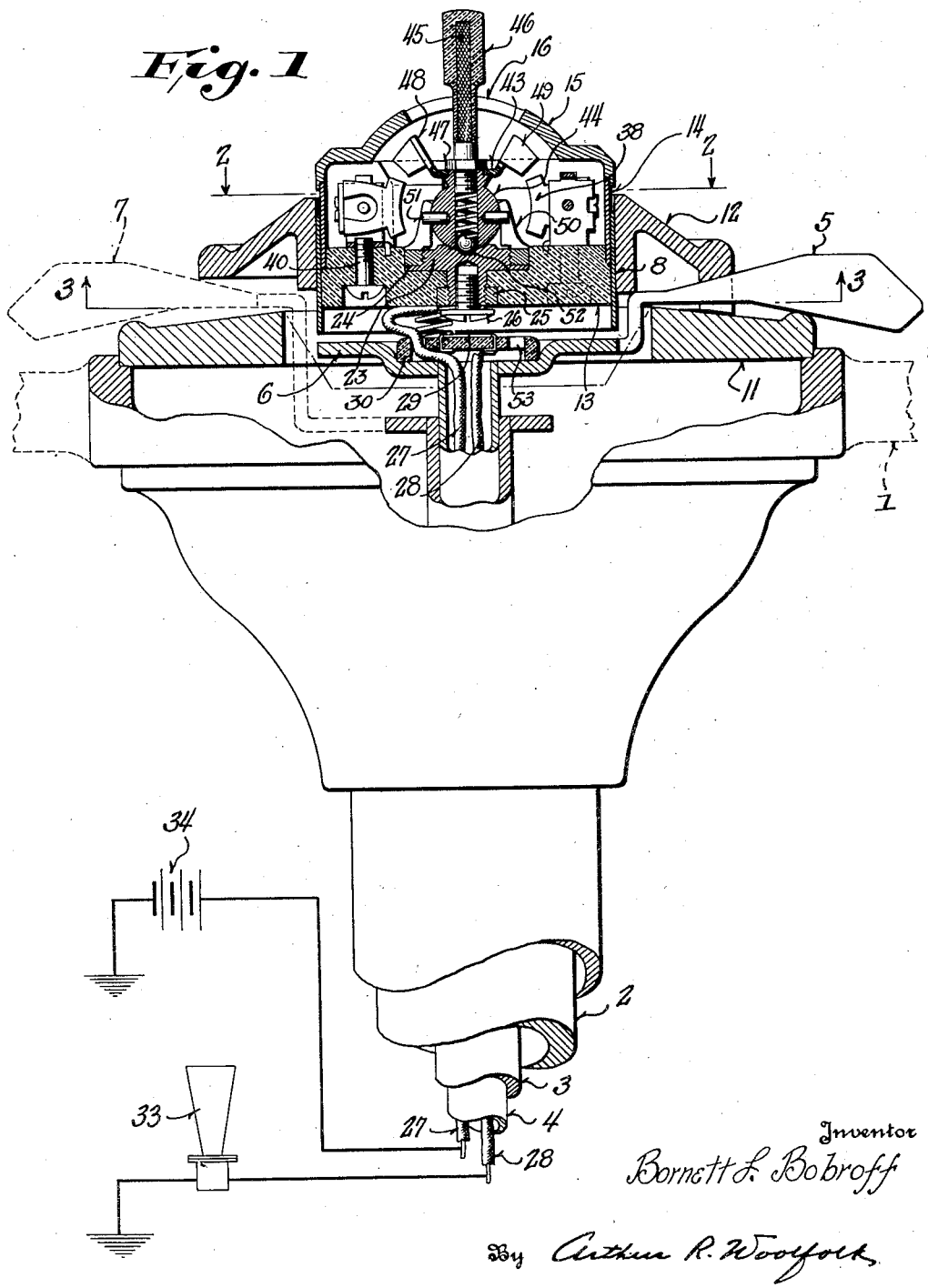

Sept. 9, 1930.  B. L. BOBROFF  1,775,585
SWITCH FOR SIGNALING SYSTEMS
Filed July 31, 1929    3 Sheets-Sheet 2
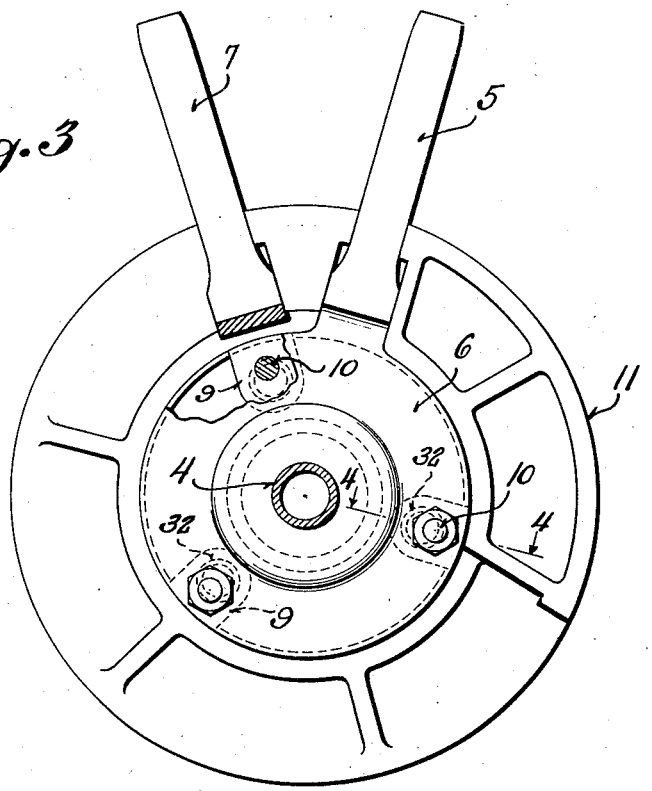
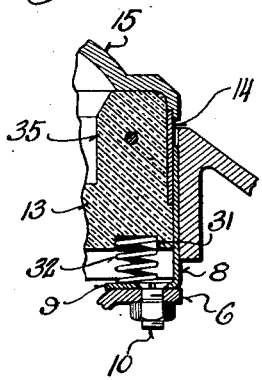
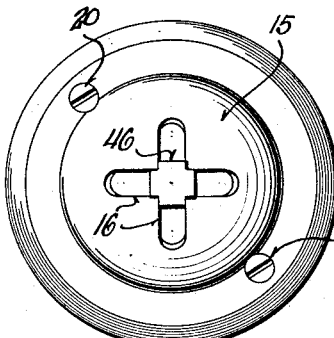
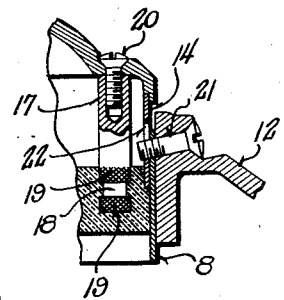
Inventor
Bornett L. Bobroff
By Arthur R. Woolfolk
Attorney Sept. 9, 1930.  B. L. BOBROFF  1,775,585
SWITCH FOR SIGNALING SYSTEMS
Filed July 31, 1929   3 Sheets-Sheet 3

Inventor
Bornett L. Bobroff
By Arthur R. Woolfolk
Attorney

Patented Sept. 9, 1930

1,775,585

UNITED STATES PATENT OFFICE

BORNETT L. BOBROFF, OF RACINE, WISCONSIN

SWITCH FOR SIGNALING SYSTEMS

Application filed July 31, 1929. Serial No. 382,322.

This invention relates to switches and is particularly directed to switches for signaling systems, such, for instance, as shown in my copending application for signaling systems for automotive vehicles, Serial Number 377,821, filed July 12, 1929.

Objects of this invention are to provide a novel form of switch which is particularly adapted for use on automotive vehicles and which is so constructed that it will readily control a plurality of signals in a simple and effective manner, and which is so made that it may be readily mounted upon the steering column of an automotive vehicle.

Further objects are to provide a switch having the characteristics noted above which is provided with a series of relatively stationary contacts carried by a body portion and which has a movable member universally mounted upon the body portion and provided with simple means for operating such universal member to cause any one of a plurality of contacts carried by such member to selectively engage corresponding relatively stationary contacts.

Further objects are to provide a novel construction of switch, having the characteristics noted above, which is very compact, which may be constructed in an attractive manner and which may be so mounted or carried by the steering column, that the body portion of the device is itself bodily movable and may be used as a horn switch or push button.

Further objects of this invention are to provide a novel form of switch construction in which the switch is carried centrally of the steering wheel but does not rotate with the wheel, in which the switch body itself is depressible and closes a pair of contacts for the horn circuit, and in which the construction may be so made that whenever the switch is operated to give a signal, the horn is sounded for an instant to thereby audibly call attention to the automobile which visibly indicates a change of direction.

More specifically, objects of this invention are to provide a novel form of switch structure for automotive vehicles in which the switch unit controls several signal circuits, in which the signal switch is mounted upon the switch control rod of the steering column and in which the switch is bodily slidable with reference to the switch control rod and is provided with the movable contact for the horn circuit, the other contact of the horn circuit being carried by the switch control rod of the steering column.

Further objects are to provide a novel construction of signal switch which has a very small number of parts, which is easy to produce by ordinary machine shop methods at a very small expense and which is reliable in operation and has a long life.

An embodiment of the invention is shown in the accompanying drawings, in which:—

Figure 1 is a fragmentary sectional view through the upper portion of a steering post and through the switch, such view corresponding to a section on the line 1—1 of Figure 2 showing diagrammatically the horn circuit.

Figure 3 is a sectional view on the line 3—3 of Figure 1.

Figure 4 is a sectional view on the line 4—4 of Figure 3.

Figure 5 is a sectional view on the line 5—5 of Figure 2.

Figure 6 is a plan view of the switch unit.

Figure 2:
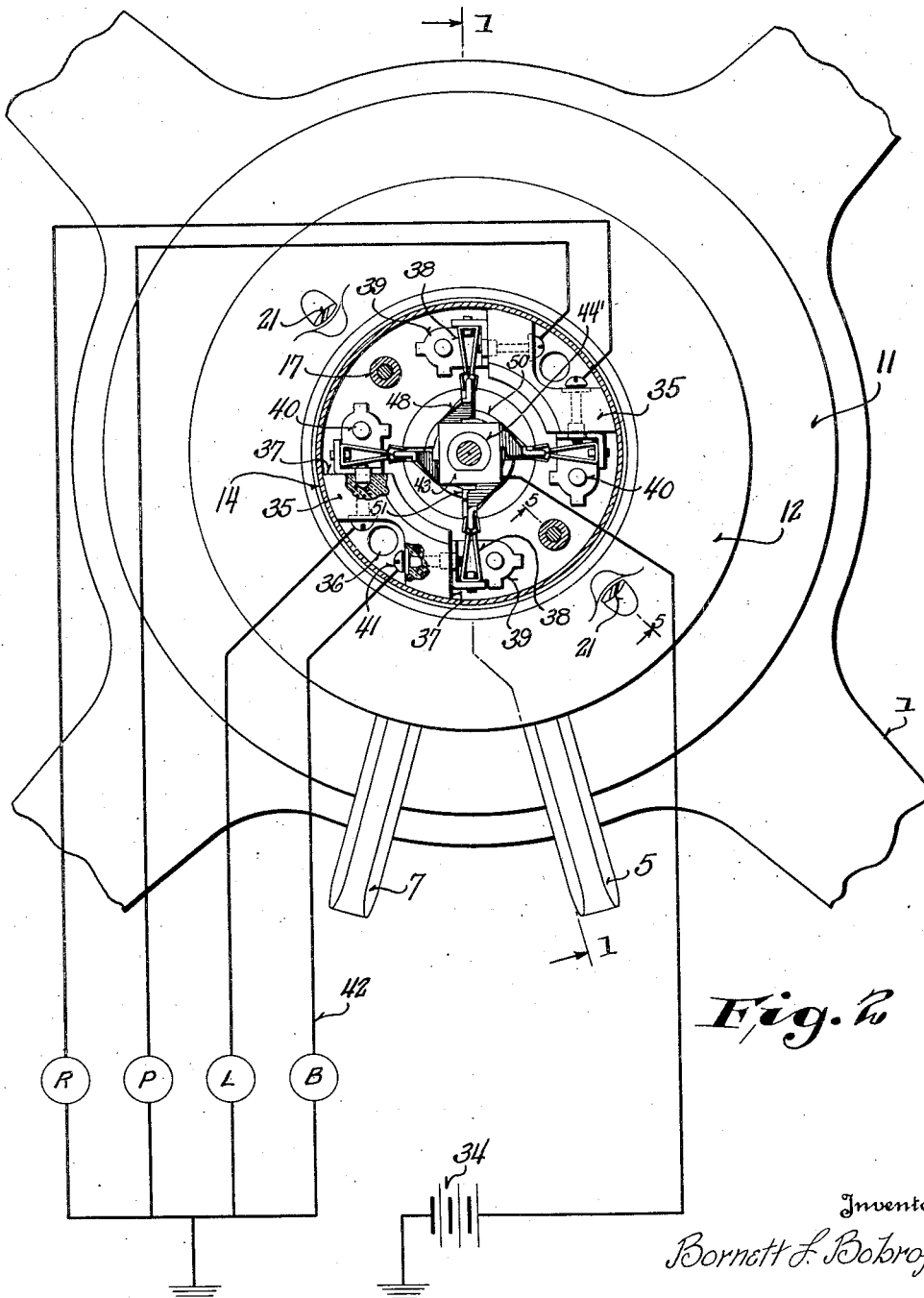
Figure 2 is a sectional view on the line 2—2 of Figure 1 showing diagrammatically the signal circuits.

Referring particularly to Figure 1, it will be seen that a steering column has been shown as provided with a steering wheel 1, a tubular steering rod 2, a tubular gas control rod 3 and a tubular light switch rod 4. A light switch lever 5 is carried by a plate 6 rigidly attached to the light switch tubular rod 4. The fuel control lever 7 is attached to the fuel control rod 3.

The switch unit is guided within a sleeve 8 which is provided with a plurality of inturned lips 9, as shown most clearly in Figure 4. These lips 9 are attached by means of screws 10 to the plate 6, the heads of the screws being preferably countersunk.

The hand wheel is usually provided with a washer or top ring 11 cut out in its center to provide room for the levers 5 and 7, as shown in Figure 1. A finishing ring 12 is rigidly mounted upon the sleeve 8 and is notched for the reception of the lever 5, as shown in Figure 3, and is cut out to provide a space for permitting rocking of the lever 7.

The switch unit comprises a base 13 (see Fig. 1) which carries a shell or sleeve 14. A top 15 completes the casing of the switch unit. This top is provided with a dome-like central portion having cross slots 16 for a purpose hereinafter to appear. The top is secured rigidly to a pair of spaced pillows 17 molded in the base and provided with a reduced portion 18 and knurled portions 19 to secure a firm binding with the base. Screws 20 pass through the cover or cap and are threaded into the pillows 17 as shown most clearly in Figure 5.

Referring again to Figure 5, it will be seen that the finishing ring 12, which is preferably formed of molded insulating material is provided with countersunk screw holes through which screws 21 pass, such screws being threaded into the sleeve 8 and if desired the screws may be partly or wholly threaded into the body of the insulating ring. These screws 21 are in reality guiding screws for guiding and limiting the bodily axial motion of the switch unit. The inwardly projecting ends of the screws extend into slots 22 formed in the sliding sleeve or shell 14 of the switch unit. The screws thus prevent relative rotation of the switch unit with respect to the guiding sleeve 8 and also limit the bodily motion of the switch unit.

The switch unit is provided with a central fitting 23 provided with a threaded portion and a shouldered flange indicated at 24 in Figure 1. This fitting is also provided with a threaded shank which extends through the base and which receives a locking nut 25. Preferably, this locking nut is countersunk within the base so that the bottom surface of the nut is flush with the bottom surface of the base. The shank is apertured and internally threaded for the reception of a terminal clamping screw 26 which also forms a contact for the horn circuit as it is connected to one one of the conductors 27 of the horn circuit. The other conductor 28 (see Fig. 1) is connected to a contact 29 carried by a molded insulating disc 30. This disc 30 is provided with a downturned marginal flange as shown in Figure 1 which fits within a recessed central portion of the metal disc 6.

The base portion 13 of the switch is provided with a plurality of regularly spaced recesses 31 (see Fig. 4) within which compression springs 32 are seated, the lower ends of these compression springs bearing upon the inturned lips 9 of the sleeve 8.

One of the conductors, for instance, the conductor 28 is connected to one side of the horn 33 (see Fig. 1), the other side of the horn being grounded. The other conductor 27 is connected to one side of the battery 34, the other side of the battery being grounded.

It is to be noted particularly from Figure 1 that the central fitting 23 is connected to the live side of the battery 34 by means of the conductor 27.

From the description thus far given it is apparent that if the switch unit is bodily depressed or moved, that contact will occur between contact screw 26 and the contact member 29, thus completing the horn circuit and sounding the horn.

Referring in greater detail to the switch unit, it will be seen that the base portion 13 is provided with a pair of opposed upwardly projecting U-shaped members 35 (see Figs. 2 and 4). These U-shaped members thus form vertical channels. Apertures 36 are provided, and extend through the base and open into these vertical channels as may be seen from Figure 2. The U-shaped members 35 are preferably molded integrally with the base and are provided with flat outer faces 37 which are arranged at right angles to each other. Obviously, if the number of pairs of contacts are increased over that shown in the drawing, the angle between the faces 37 will be correspondingly varied. However, as shown in the drawings, four stationary contacts 38 are provided and are attached to the faces of the U-shaped members 35.

These stationary contacts 38 are preferably formed of resilient U-shaped arms, the center point of which is joined to supporting clips 39. These supporting clips are each provided with two portions at right angles to each other and preferably with outwardly turned lips which fit into apertures formed in the base and in the U-shaped upwardly projecting portions 35. This construction is shown very clearly in Figures 1 and 2. The contact carrying clips 39 are locked to the base by means of screws 40 as shown in Figures 1 and 2 and are also locked to the vertical faces 37 of the U-shaped members 35 by means of the conductor attaching screws 41 (see Fig. 2). These conductor attaching screws 41 are adapted to receive the conductors 42 which pass downwardly through the apertures 36 formed in the base.

It will be seen from the description thus far given that the U-shaped members 35 not only furnish supports for the stationary contacts but also form housing channel members for the conductors 42 leading from the conductor receiving screws 41. Thus the conductors are held out of the way from the switch mechanism. It is preferred to provide the contact members 38 with outwardly turned lips as shown in Figure 2 to facilitate the entrance of the movable contacts.

The movable portion of the switch comprises a movable contact plate or member 43 (see Fig. 1) which is rigidly attached to a ball 44 and the shank 45 of a manipulating handle 46. The shank 45 of the handle is provided with a shoulder 47 which clamps the contact member 43 rigidly to the handle and to the ball 44. The contact plate 43 receives a small neck of the ball 44 as shown in Figure 2, the neck portion being indicated by the reference character 44'. This neck portion is preferably provided with a flattened side as shown in Figure 2, to prevent rotation of the contact plate. Contact plate 43 is provided with a plurality of outwardly projecting arms 48 which terminate in substantially radially extending movable contacts 49. These contacts are arranged adjacent the stationary contacts 38 as shown in Figures 1 and 2. Preferably the upper end of the handle shank 45 is knurled or roughened as shown in Figure 1 and the handle proper 46 consists of an insulating member molded in place about the shank 45 and bound to said shank. The ball 44 is seated within a socket preferably of spherical contour which is formed in the fitting 23. A retaining sleeve or bearing sleeve 50 surrounds the ball and holds it in place in its socket. In fact, the sleeve 50 serves also as a socket.

The sleeve 50 is provided with a slightly inturned upper portion which grips around the ball 44 as shown in Figure 1 and thus prevents accidental removal of the ball. Preferably the sleeve 50 is provided with a plurality of slots extending through each side and lying within planes making an angle to each other.

Preferably the sleeve or bearing 50 is slotted to receive pins 51 carried by the ball 44 as shown in Figure 1. These pins and slots maintain alignment of each movable contact and the particular stationary contact at the instant that the movable contact enters its stationary contact. It is understood that two pairs of slots are formed in the sleeve 50 and that these slots are in planes at right angles to each other. Correspondingly, two pairs of pins 51 are carried by the ball 44 and slide within these slots. In other words, the number of pins and slots correspond identically with the pairs of stationary and movable contacts. Further, the bearing sleeve 50 is slightly contracted at its upper end to fit around the ball 44 and thus prevent removal of the ball. A spring-press ball 52 is seated within the aperture through the bearing ball 44 into which a stem 45 is screwed as shown in Figure 5, the spring being carried within this aperture. The latching ball 52 is adapted to snap into a centrally arranged depression or recess formed in the fitting 23 to thus maintain or hold the movable member or rocking lever in neutral position. Obviously, if desired, additional apertures or recesses could be provided to receive the ball when the switch is moved into its several operative positions without departing from the spirit of this invention.

The conductors 42 and the conductor 27 pass through opening 53 formed in the plate 30. These conductors are looped outwardly, one of the conductors, namely conductor 27, being shown in Figure 1. These outwardly looped portions serve to hold the plate 30 in place against the plate 6, also the tension upon the conductor 28 aids in holding the plate 30 in position upon the plate 6. The conductors 42 extend to the signal members B, L, P, and R, as shown in Figure 2. These signal members B, L, P and R are preferably in the form of lamps and are adapted to illuminate indicating legends as described in my copending application noted above. It is obvious that instead of the single indicating means shown diagrammatically in Figure 2, a plurality of groups of indicating lamps could be employed as indicated in my copending application noted above. These signal lamps B, L, P and R correspond respectively to the signals "Back", "Left", "Park" and "Right".

As shown in Figure 6, it is preferable to form the insulating portion 46 of the handle (see Fig. 1) of a cross so as to afford a firm grip when grasped by the operator. The handle is adapted to be rocked into any one of a plurality of paths at an angle to each other to thus selectively cause the different pairs of movable and stationary contacts to engage and to thus close the appropriate signal circuit. In the form of the invention shown, the slots (see Fig. 6) are arranged at right angles to each other.

In operating the device, if it is desired to give a right turn signal the switch handle is merely rocked to the right thus closing the circuit through the indicating means "R". Similarly for a left turn, the switch is rocked to the left thus causing the lamp "L" (see Fig. 2) to be illuminated. Similarly for a backing signal, the lever is swung backwardly to the rear. The parking signal is given when the lever is swung forwardly.

It may be found desirable to so proportion the springs 32 to the effort required to operate the switch lever that each time the switch lever is moved to the side or to the front or back that the horn is sounded. This could readily be secured by properly proportioning the strength of the springs 32 as stated, so that the switch unit would be bodily depressed whenever the switch lever was rocked outwardly. This arrangement would give a short audible signal from the automobile which would be instantly supplemented by a visual signal indicating the change of direction or intention of the driver. However, if it is not desired to utilize this double action, the springs 32 could be made slightly heavier or stiffer so that the horn would not be sounded when the switch was operated.

At all events it is intended that the horn shall be sounded when the switch unit is bodily moved or depressed. In other words, the switch unit can be operated in the same manner as a push button, in addition to serving all of its functions as a selective signaling switch.

It will be seen that the universally mounted movable member of the switch consists of the operating lever or handle and the movable contacts rigid therewith. From this construction it is apparent that scarcely any thought is required of the driver as he is merely required to swing the switch lever in the general direction that he intends traveling, for example, to the right, left, or back.

It is to be distinctly understood that although the invention as specifically shown and described, illustrates the switch unit as supported or slidably carried by the light switch tubular rod, that nevertheless the switch unit could be mounted upon any other suitable portion of the steering column, although the detailed construction described has been found eminently satisfactory.

It will be seen further that a very attractive and pleasant type of switch is provided in this invention and that practically no metal parts are visible. For instance, the finishing ring 12, the top or cap 15 and the handle 46 may all be formed of molded bakelite, rubber, fibre or other insulating material.

It will also be noted that the switch, although it is capable of functioning in a large number of different ways, is nevertheless extremely simple in construction, is rugged and is so made that it may be cheaply produced and easily applied to existing types of steering columns.

Although the invention has been described in considerable detail, it is intended that such description be interpreted as illustrative rather than limiting, as the invention may be variously embodied and is to be interpreted as claimed.

I claim:

1. A switch for a signaling system comprising a movable lever having a ball at one end, a socket for said ball and forming with said ball a universal support for said lever, said socket having slots formed therein and lying in planes at an angle to each other, a plurality of pins carried by said ball and slidable within said slots, a plurality of stationary contacts surrounding said lever, and a plurality of movable contacts connected to said ball, whereby said movable contacts may selectively engage said stationary contacts, said pins and slots insuring alignment of a movable contact with the corresponding stationary contact when said movable contact engages said stationary contact.

2. A switch comprising a body portion having a plurality of contacts, movable means adapted to selectively engage said contacts, a pair of auxiliary contacts adapted to come into engagement with each other when said body portion is moved in one direction, and means yieldingly supporting said body portion and allowing said body portion to bodily move to cause said auxiliary contacts to engage each other.

3. A signal switch for automobiles comprising a body portion having a plurality of contacts, movable means carried by said body portion for selectively engaging said contacts, means supporting and guiding said body portion and allowing said body portion to bodily move, an auxiliary contact, and a contact carried by said body portion and adapted to engage said auxiliary contact when said body portion is moved.

4. A combined signal and horn switch adapted to be supported from the steering column of an automotive vehicle, said switch comprising means for attachment to a portion of said steering column, a body portion slidably guided by said means, a spring urging said body portion outwardly, a pair of horn contacts closed by said body portion when said body portion is moved inwardly, a series of contacts carried by said body portion, and means movably carried by said body portion and adapted to engage any of said series of contacts.

5. A combination switch comprising a body portion adapted to be bodily moved, means guiding said body portion, a series of contacts carried by said body portion, a series of movable contacts adapted to selectively engage said first mentioned series of contacts, an operating member carried by said body portion and controlling the selective engagement of said series of contacts, and a pair of auxiliary contacts whose engagement is controlled by the bodily movement of said body portion.

6. A switch comprising a body portion, a lever, a ball and socket joint connecting said lever to said body portion, a plate carried by said lever and having a plurality of radially projecting contacts, a group of contacts surrounding said lever and adapted to be selectively engaged by said first mentioned contacts, and means for producing alignment of each radially arranged contact with the corresponding contact of said group of contacts.

7. A switch construction for the steering column of an automotive vehicle comprising a switch control rod, guiding means carried by said rod, a switch unit slidably guided by said guiding means, a pair of contacts adapted to be closed by the bodily sliding movement of said switch unit, said switch unit having contacts, and a movable operating member carried by said switch for controlling said last mentioned contacts.

8. A switch construction for the steering column of an automotive vehicle comprising a switch control rod adapted to be rotated about its axis, a switch unit having contacts and a member for controlling said contacts, means yieldingly connecting said switch unit and said control rod and allowing bodily movement of said switch unit with reference to said control rod, and a pair of auxiliary contacts controlled by the bodily movement of said switch unit.

9. A switch construction for the steering column of an automotive vehicle comprising a switch control rod adapted to be rotated about its axis, a contact carried by said rod, a switch unit slidably guided and carried by said rod and provided with a contact adapted to engage said first mentioned contact when said switch unit is bodily moved with reference to said rod, said switch unit including a movable member and contacts controlled thereby.

10. A switch construction for the steering column of an automotive vehicle comprising a switch control rod; a signal switch unit having an operating member, a plurality of stationary contacts, and a plurality of movable contacts controlled by said operating member; means carried by said rod for guiding said switch unit; a spring urging said switch unit outwardly with respect to said rod; a contact carried by said rod; and a contact carried by said switch unit adapted to engage the contact carried by said rod when said switch unit is bodily moved inwardly towards said rod.

11. A switch construction for the steering column of an automotive vehicle comprising a switch control rod adapted to be rotated about its axis, and a switch unit carried by said rod and having a laterally movable operating member, whereby said rod may be rotated without operating said switch and whereby said operating member may be moved laterally without rotating said rod.

12. A signal switch comprising a base formed of insulating material; a U-shaped, insulating member rigid with said base and projecting upwardly therefrom and having side faces, said U-shaped member forming an upwardly projecting channel; stationary contacts arranged at an angle to each other and carried at the faces of said U-shaped member; conductor-attaching screws having their heads located within the channel of said U-shaped member; said base having an opening therethrough, located within the channel of said U-shaped member, through which conductors may be passed; movable contacts adapted to engage said stationary contacts; and a movable member for actuating said movable contacts.

In testimony whereof, the signature of the inventor is affixed hereto.

BORNETT L. BOBROFF.